United States Patent
Pu et al.

(10) Patent No.: US 9,784,329 B2
(45) Date of Patent: Oct. 10, 2017

(54) COMPOSITE BRAKE DRUM WITH BANDS

(71) Applicant: Shangdong Haoxin Machinery Co., Ltd., Weifang (CN)

(72) Inventors: Guangming Pu, Weifang (CN); Jixian Lv, Weifang (CN)

(73) Assignee: SHANDONG HAOXIN MACHINERY CO., LTD., Weifang, Shandong (CN)

(*) Notice: Subject to any disclaimer, the term of this patent is extended or adjusted under 35 U.S.C. 154(b) by 0 days.

(21) Appl. No.: 14/988,757

(22) Filed: Jan. 6, 2016

(65) Prior Publication Data

US 2016/0195149 A1  Jul. 7, 2016

Related U.S. Application Data

(63) Continuation-in-part of application No. PCT/CN2015/078550, filed on May 8, 2015.

(30) Foreign Application Priority Data

Sep. 1, 2014 (CN) .......................... 2014 1 0439863

(51) Int. Cl.
*F16D 65/12* (2006.01)
*F16D 65/10* (2006.01)
(Continued)

(52) U.S. Cl.
CPC ............ *F16D 65/10* (2013.01); *B23P 11/025* (2013.01); *F16D 2065/1332* (2013.01)

(58) Field of Classification Search
CPC . F16D 65/12; F16D 2065/1332; B23P 11/025
See application file for complete search history.

(56) References Cited

U.S. PATENT DOCUMENTS

| 2,493,173 A | * | 1/1950 | Van Halteren ......... F16D 65/10 188/218 R |
| 3,583,533 A | * | 6/1971 | Jones, Jr. ................ F16D 65/10 188/218 R |

(Continued)

FOREIGN PATENT DOCUMENTS

| EP | 0879975 | * | 11/1998 |
| GB | 410840 | * | 5/1934 |
| GB | 2113327 | * | 8/1983 |

*Primary Examiner* — Vishal Sahni
(74) *Attorney, Agent, or Firm* — Kening Li; Miller Canfield

(57) ABSTRACT

The present invention discloses a brake drum comprising: a brake drum body, which comprises a mounting portion for connecting a wheel, a braking portion for engagement with a brake shoe, and a transitional connecting portion disposed between the mounting portion and the braking portion; a hoop device is tightly mounted to the outer peripheral surface of the brake portion. The hoop device adopts a plurality of split-type hoop ferrules, or one unibody hollowed-out hoop case. The hoop device tightly mounted to the outer peripheral surface of the brake portion can not only effectively restrain the radial expansion deformation, thereby improving the fatigue resistance of the brake drum body, but also applies a clasp force to the brake drum body, thereby avoiding the danger of burst and flying out of the brake drum body, which greatly improves service life and safety. Moreover, the thickness of the brake portion wall corresponding to the hoop device can be effectively reduced, which not only effectively decreases the temperature difference between the interior and exterior of the brake drum body, but also increases heat conductivity, thereby laying foundation for both heat dissipation and prevention of the happening of the multiple cracks in the inner wall of the brake drum body.

17 Claims, 6 Drawing Sheets

(51) Int. Cl.
*B23P 11/02* (2006.01)
*F16D 65/02* (2006.01)

(56) References Cited

U.S. PATENT DOCUMENTS

| | | | | |
|---|---|---|---|---|
| 4,008,517 | A * | 2/1977 | Schrader | B22D 15/00 164/122 |
| 5,345,672 | A * | 9/1994 | Ball | B23Q 15/02 29/705 |
| 5,782,324 | A * | 7/1998 | Wall | B22D 19/00 188/218 R |
| 6,206,150 | B1 * | 3/2001 | Hill | F16D 65/0006 188/218 R |
| 6,264,012 | B1 * | 7/2001 | Yamazaki | F16D 65/0006 188/218 R |
| 2009/0065313 | A1 * | 3/2009 | Levering | F16D 65/10 188/218 R |

* cited by examiner

COMPOSITE BRAKE DRUM WITH BANDS

STATEMENT

The present invention claims the priority of the following three patent applications: Chinese invention patent application titled "Circular groove steel hoop brake drum", of which the application date is Sep. 1, 2014 and the application number is 201410439863.9.

Chinese utility model patent application titled "A brake drum", of which the application date is Mar. 26, 2015, and the application number is 201520175568.7.

Chinese utility model patent application titled "Brake drum", of which the application date is Apr. 29, 2015, and the application number is 201520270335.5.

TECHNICAL FIELD

The present invention belongs to the technical field of drum-typed brake for using in vehicles, especially relates to a brake drum.

BACKGROUND ART

Drum-typed brake is one of the important systems of vehicles and is a brake system applied in vehicles at the earliest time. Its greatest advantage lies in that it is simple in structure and economical in cost, but it can provide a potent braking force, and it can also be easily installed and maintained.

At present, integrally cast drum-typed brake is widely used in heavy trucks. The integrally cast drum-typed brake comprises a brake drum and a brake shoe. The brake shoe is mounted in the brake drum and can contact with the inner side face of the brake drum. The brake drum is mounted on the wheels and rotates with the wheels during moving of an automobile. When braking, the brake piston will push the brake shoe outwardly to make it press against the inner side face of the brake drum, and the frictional resistance between the shoe and the brake drum slows down or stops the moving automobile, so as to ensure driving safety.

When a vehicle is heavily loaded or moving in a high speed, especially when going down a long or steep slope, a large braking force and continuous multiple times of braking are required to ensure the controllable condition of the vehicle, which causes the temperature of the inner wall of the brake drum rise rapidly and the temperature difference between the interior and exterior of the brake drum increase, resulting in a sharp decreasing of the high temperature mechanical properties of the materials making up the brake drum and also a decrease of fatigue strength of the materials. The traditional material of brake drum is gray cast iron which has advantages of large friction coefficient and excellent heat transfer property, while its strength is low and brittleness is large. In order to reduce the negative effect brought by these features, the wall of the brake drum must be made very thick, so as to ensure a higher structural strength of the brake drum. A thick wall, however, will cause the temperature difference between the interior and exterior of the brake drum body to increase during braking, which in turn produces a large temperature difference stress and causes the high temperature mechanical properties of materials to deteriorate, and furthermore, because the resulting expansion stress cannot be eliminated in time, the brake drum body develops longitudinal micro cracks, which gradually develops into a lot of cracks and finally causes fracture. Thus, the service life of the integrally cast drum-typed brake is short.

A thickened brake drum wall will also increase the weight of the whole vehicle, increase gasoline consumption and manufacturing cost, which is not good for energy conservation and emission reduction.

Moreover, it is well known that brake drums will be in a high temperature state after braking, if it contacts with water, the drum body may be heat-cracked and blown out due to the chilling, and more seriously, the brake drum can burst and fly out causing safety accidents, and therefore, the safety of use is poor.

Various attempts have been made in improving the conventional drum brakes for increased strength, heat dissipation, and durability, and lightened weight. For example, composite brake drums were made that contain a steel shell with gray cast iron centrifugally cast into the steel shell. The steel shell provides the structural strength to prevent cracking, and the gray iron liner provides the wear surface for the brake lining and heat absorption from the friction of the brake lining. The composite brake drum is conventionally fortified by a "squealer band", positioned near the inboard, open end of the brake drum, to provide rigidity and to prevent cracks that may start at the open end. An improvement of this configuration, U.S. Pat. Publication No. US2009/0065313, locates the squealer band midway along the width of the brake drum main body, to provide efficient use of the brake structure to receive the force from the brake shoe, and to absorb the most heat, because the mid-point of the brake drum is the portion on which the most force is exerted from the brake shoe.

These prior art brake drums still suffer from the above discussed drawbacks. For example, the steel shell is a poor heat conductor. Attempts were made to facilitate heat dissipation by adding axial fins or rigs to the squealer band, see e.g. US 2008/0308364, but the results remain unsatisfactory.

CONTENTS OF THE INVENTION

The technical problem to be solved in the present invention is to provide a brake drum to reduce the weight of the whole vehicle, improve the strength and heat dissipation property of the brake drum, thereby improving safety and extending service life of the brake system, with a more economic cost.

In order to solve said technical problem, one technical solution of the present invention is: a brake drum, comprising: a brake drum body having a cylindrical shape, which sequentially includes in its axial direction a mounting portion for connecting with a wheel, a braking portion for fitting with a brake shoe, and an opening end of the brake drum; a transitional connecting portion is disposed between the mounting portion and the braking portion; wherein, a hoop device is tightly mounted to the outer peripheral surface of the braking portion.

As an improvement, the hoop device is constructed from steel materials. Via the clasp force of the hoop device, on the premise that the thickness of the brake drum is reduced, the structural strength of the brake drum body is maintained or even improved, while the heat dissipation property of the brake drum is hardly affected.

As an improvement, the structure of a hoop device is: comprising two or more than two hoop ferrules. Said hoop ferrules have a radial height along the diameter direction of the brake drum and an axial height along the axial direction of the brake drum. According to one technical solution of the present invention, whatever cross section shapes the hoop ferrule has, its radial height is appropriately greater than its axial height so as to maximize the axial strength, and meanwhile reduce the contact area with the brake drum body made of gray cast iron to avoid hindering heat dissipation.

As described hereinafter, the cross section shape of the hoop ferrule may be rectangular, U-shaped, L-shaped, T-shaped, H-shaped, tooth-shaped structure, or having a heat dissipation groove. Selection of the shape is to reduce the thickness and weight of the hoop ferrule while increase its heat dissipation surface area as possible, on the premise of ensuring the structural strength of the brake drum body.

According to one technical solution of the present invention, the cross section area of the hoop ferrule in the middle position of the brake drum can be greater than the cross section area of the hoop ferrules on two sides. Because when braking, the force imposed on the braking portion will incrementally decrease from the middle position to the two sides, the arrangement of the size of the hoop ferrule incrementally decreasing from the middle position to the two sides can ensure the safety of the brake drum body while reduce the weight and cost as far as possible. On the basis of not affecting the above principles, the height and shape of the hoop ferrule can be changed according to other technical requirements. For instance, the height of the hoop ferrule which is adjacent to the mounting portion where the brake drum body is connected to a wheel may be lower so as to avoid contacting with the air valve of the wheel.

According to one technical solution of the present invention, the hoop device is a hollowed-out hoop case. The unibody structure of the hoop case is easy for assembling, and can increase the assembling efficiency of the hoop case and the brake drum body.

According to one technical solution of the present invention, a plurality of hoop ferrule mounting grooves are disposed on the outer peripheral surface of the braking portion, and each hoop ferrule is restrainedly mounted in one hoop ferrule mounting groove.

Wherein, the cross section shape of the hoop ferrule is an unequal height U-shaped structure; the outer peripheral surface of the braking portion is disposed with one hoop ferrule mounting groove, and all the hoop ferrules abut against each other sequentially and are restrainedly mounted in the hoop ferrule mounting groove.

Wherein, the radial height of the hoop ferrule decreases incrementally from the middle position to the two sides.

As another improvement, the structure of the hoop device is: comprising a plurality of first hoop ferrules arranged and disposed in the axial direction, and a second hoop ferrule disposed away from the transitional connecting portion and between two adjacent first hoop ferrules, and all the first and second hoop ferrules abut against each other; the width of the first hoop ferrule is greater than that of the second hoop ferrule, and the external diameter of the first hoop ferrule is less than that of the second hoop ferrule.

Wherein, the cross section shape of the first hoop ferrule is U-shaped or L-shaped or square; the end of the second hoop ferrule which is away from the braking portion is square or semicircular or U-shaped.

As still another improvement, the structure of the hoop device is: comprising two or more than two hoop ferrules; the cross section of the hoop ferrule is a rectangle or a rough rectangle, two or more than two heat dissipation grooves are disposed on one side of the hoop ferrule at intervals, or two or more than two heat dissipation grooves are disposed on each side of the two sides of the hoop ferrule at intervals.

Wherein, the width of the bottom is greater than that of the top on the cross section of the hoop ferrule.

As a further improvement, the structure of the hoop device is: comprising a hollowed-out hoop case, wherein the solid part of the hoop case is connected together, and the hollow part of the hoop case is in communication with atmosphere.

Wherein, the hollow part of the hoop case comprises one or more than one heat dissipation hole groups, each heat dissipation hole group comprising two or more than two arc-shaped long holes arranged along the circumferential direction at intervals.

As another improvement, two or more than two annular convex ribs are disposed on part of the outer peripheral surface of the braking portion adjacent to the transitional connecting portion, and an annular groove is formed between two adjacent annular convex ribs.

Upon employing the above technical solutions, the beneficial effects of the present invention are:

The hoop device tightly mounted to the outer peripheral surface of the braking portion can not only effectively restrain the radial expansion deformation and improve the fatigue resistance, but also applies a clasp force to the brake drum body, eliminating the danger of burst and flying out of the brake drum body, which greatly improves service life and safety. Moreover, the wall thickness of the braking portion corresponding to the hoop device can be effectively reduced, which not only reduces the brake weight and effectively decreases the temperature difference between the interior and exterior of the brake drum body, but also increases heat conductivity, which lays foundation for both heat dissipation and prevention of the happening of multiple cracks in the inner wall of the brake drum body.

The annular convex ribs disposed on part of the outer peripheral surface of the braking portion not only improves the strength of the brake drum body, but also increases heat dissipation areas, and moreover, the manufacturability is excellent and the cost is low. Combining with the hoop device, it further achieves the goal of improving safety and extending service life with a more economical cost.

When the hoop device uses split-type hoop ferrules, the hoop ferrules are easy to be processed and manufactured due to their single row structure, which improves the flexibility of assembling.

When the hoop device uses hollowed-out hoop case, the hoop ferrules are easy to be assembled due to their unibody structure, which improves the assembling efficiency of the hoop case and the brake drum body.

As another improvement, a method for manufacturing the brake drum of the present invention is: the drum body is constructed by casting, and then the drum body especially the braking portion of the drum body is subjected to post-processing such as cutting to increase the uniformity of the drum body to ensure the assembling precision of the hoop ferrule. At the same time, the casting residual of the drum body after processing is low, which improves the dynamic balance of the brake drum. The post-processing approach is used to form hoop ferrule grooves and the aforementioned convex rib structures. Post-processing may be applied only to the outer peripheral surface of the drum body. Hoop ferrules are independently manufactured and processed, and then tightly mounted to the drum body after heat expansion. The method of the present invention also improves the dynamic balance of the brake drum and increases the yield of final products.

Figure 1:
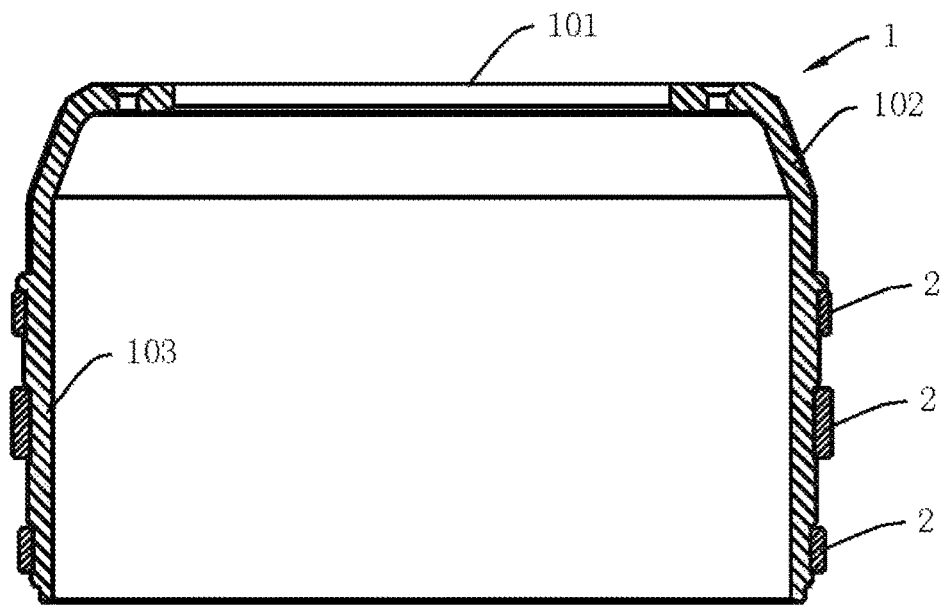
FIG. 1 is a vertical sectional view according to Example 1 in the present invention.

In the Drawings, 1—brake drum body; 101—mounting portion; 102—transitional connecting portion; 103—brake portion; 104—annual convex rib; 105—annular groove; 2—hoop ferrule; 23—first hoop ferrule; 24—second hoop ferrule; 2a—hoop ferrule; 2b—hoop case; 201—heat dissipation groove; 202—annual convex rib; 203—arc-shaped long hole; 3—annular groove.

EMBODIMENTS

In order to clearly understand the objectives, technical solutions and advantages of the present invention, the present invention will be further described in detail in reference to the drawing and examples herein below. It should be understood that the specific examples described herein are only used to explain the present invention, but not used to limit the present invention.

Example 1

As shown in FIG. 1, a brake drum, comprising: a brake drum body 1 preferably made of cast iron materials, which comprises a mounting portion 101 for connecting a wheel and a brake portion 103 for fitting with a brake shoe; a transitional connecting portion 102 is disposed between the mounting portion 101 and the brake portion 103; a hoop device is tightly mounted to the outer peripheral surface of the brake portion 103, wherein, the hoop device comprises a plurality of (two or more than two) hoop ferrule 2 arranged in the axial direction which is preferably made of steel materials. Via the clasp force of the hoop ferrule 2, on the premise that the thickness of the brake drum body 1 is reduced, the structural strength, heat dissipation property, mechanical property and safety of the brake drum body 1 are increased, and the service life of the brake drum is extended.

In FIG. 1, the cross section shape of the hoop ferrule 2 is rectangular, and preferably, the cross sectional area of the hoop ferrule 2 in the middle position is larger than that of the hoop ferrule 2 on two sides. Because when braking, the force imposed on the braking portion 103 will incrementally decrease from the middle position to the two sides, the arrangement of the cross sectional area of the hoop ferrule 2 incrementally decreasing from the middle position to the two sides can ensure the safety of the brake drum body 1; a plurality of hoop ferrule mounting grooves are disposed on the outer peripheral surface of the brake portion 3, and each hoop ferrule 2 is restrainedly mounted in one hoop ferrule mounting groove.

Example 2

Figure 2:
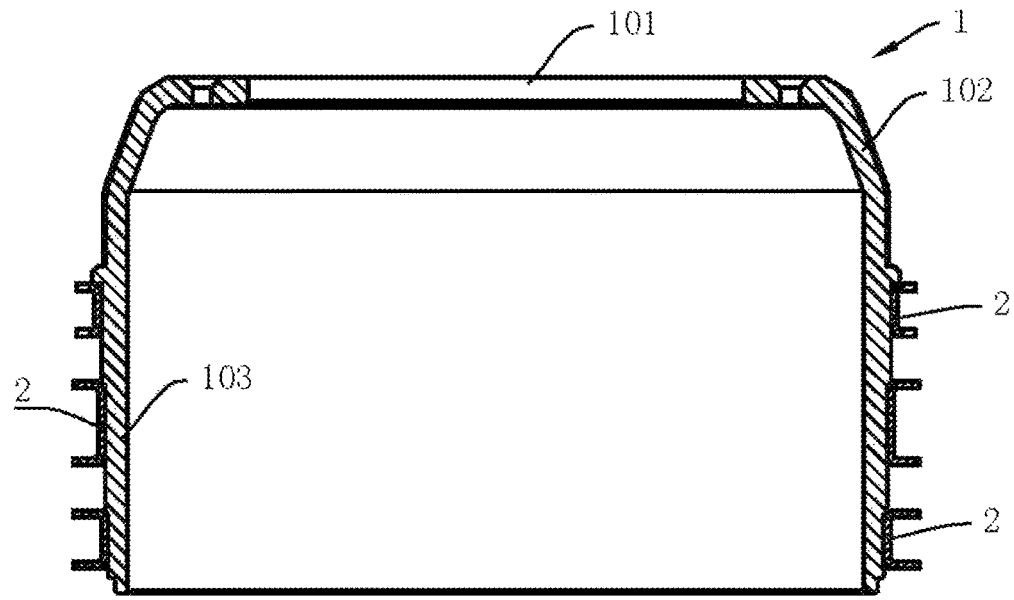
FIG. 2 is a vertical sectional view according to Example 2 in the present invention.

As shown in FIG. 2, the structure of Example 2 is basically identical with that of Example 1, and the differences are: the cross section shape of the hoop ferrules 2 is U-shaped, which can decrease the thickness of the hoop ferrules 2 and in turn reduce the weight of the hoop ferrules 2 on the premise of ensuring the structural strength of the brake drum body 1.

Example 3

Figure 3:
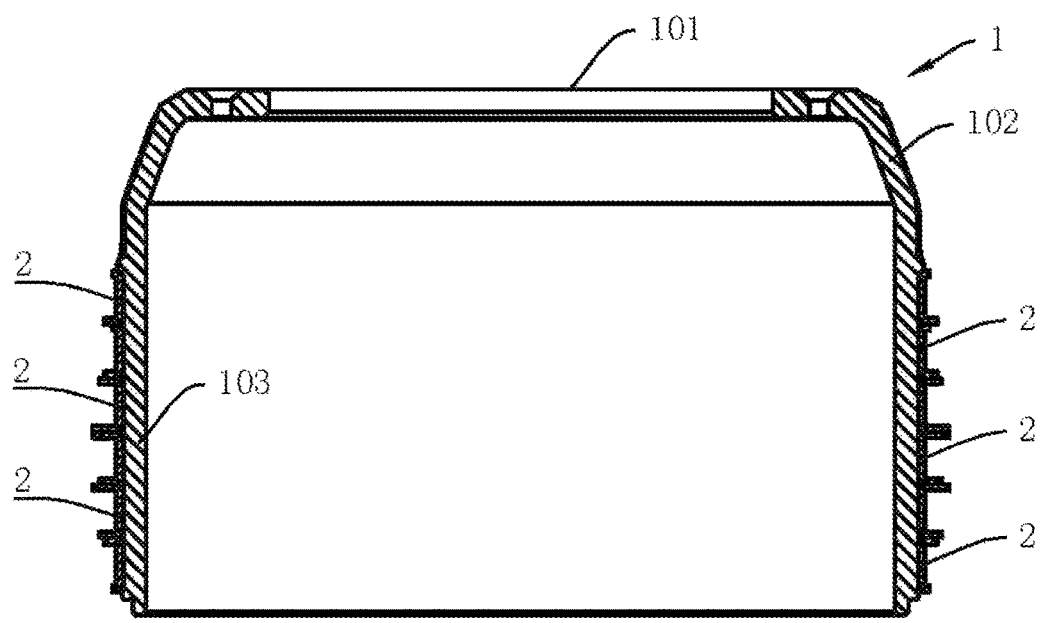
FIG. 3 is a vertical sectional view according to Example 3 in the present invention.

As shown in FIG. 3, the structure of Example 3 is basically identical with that of Example 2, and the differences are: the cross section shape of the hoop ferrules 2 is unequal-height U-shaped; the outer peripheral surface of the brake portion 103 is disposed with a hoop ferrule mounting groove, and all the hoop ferrules 2 abut against each other and are restrainedly mounted in the hoop ferrule mounting groove. The outer peripheral surface of the brake portion 103 is covered with hoop ferrules 2, which can avoid the phenomenon of heat crack and burst of the brake drum body 1 by contacting with water directly when the brake drum body 1 suffers heat and chilling; in addition, the clasp force of the hoop ferrules 2 is much stronger when a plurality of hoop ferrules abut against each other, which avoids the danger of burst and flying out of the brake drum body 1, thereby improving safety, and extending the service life of the brake drum.

Preferably, the heights of the hoop ferrules 2 incrementally decrease from the middle position to two sides of the brake drum. Because when braking, the force imposed on the braking portion 103 will incrementally decrease from the middle position to the two sides, the arrangement of the heights of the hoop ferrule 2 incrementally decreasing from the middle position to the two sides can ensure the safety of the brake drum body 1.

Example 4

Figure 4:
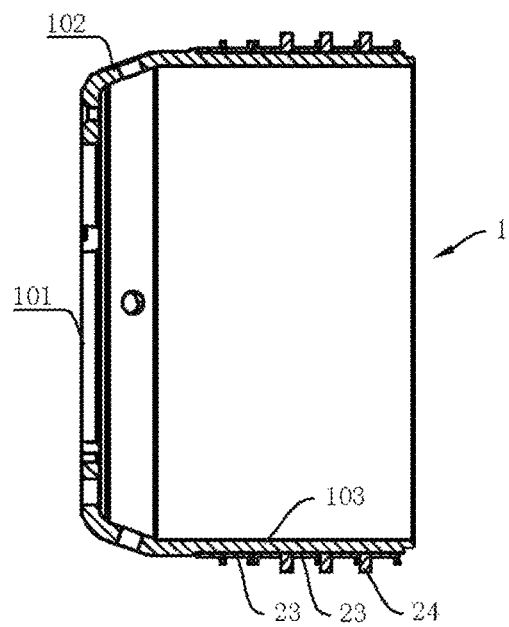
FIG. 4 is a vertical sectional view according to Example 4 in the present invention.

As shown in FIG. 4, the structure thereof is basically identical with that of Example 3, and the differences are: in Example 4, the hoop device comprises a plurality of first hoop ferrules 23 arranged and disposed in the axial direction, second hoop ferrules 24 which are away from the transitional connecting portion 102 and disposed between two adjacent first hoop ferrules 23, and all first hoop ferrules 23 and second hoop ferrules 24 abut against each other; wherein, the width of the first hoop ferrule 23 is greater than that of the second hoop ferrule 24, and the external diameter of the first hoop ferrule 23 is less than that of the second hoop ferrule 24. The coordination design of the first hoop ferrules 23 and the second hoop ferrules 24 improves the structural strength, mechanical property, and bearing capacity of the brake drum.

As shown in FIG. 4, the cross section shapes of the first hoop ferrule 23 are L-shaped, and of course, they may also be U-shaped or square; second hoop ferrules 24 away from the brake portion 103 are square, and of course, they may also be semicircular or U-shaped.

Example 5

Figure 5:
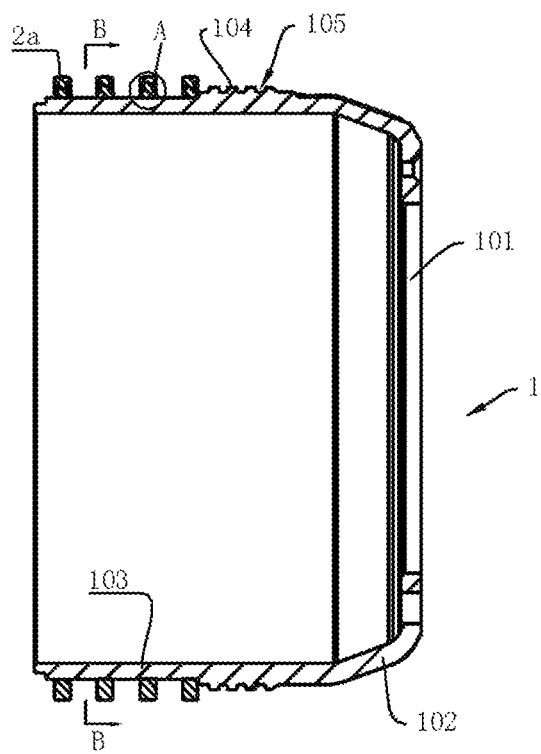
FIG. 5 is a vertical sectional view according to Example 5 in the present invention.
Figure 6:
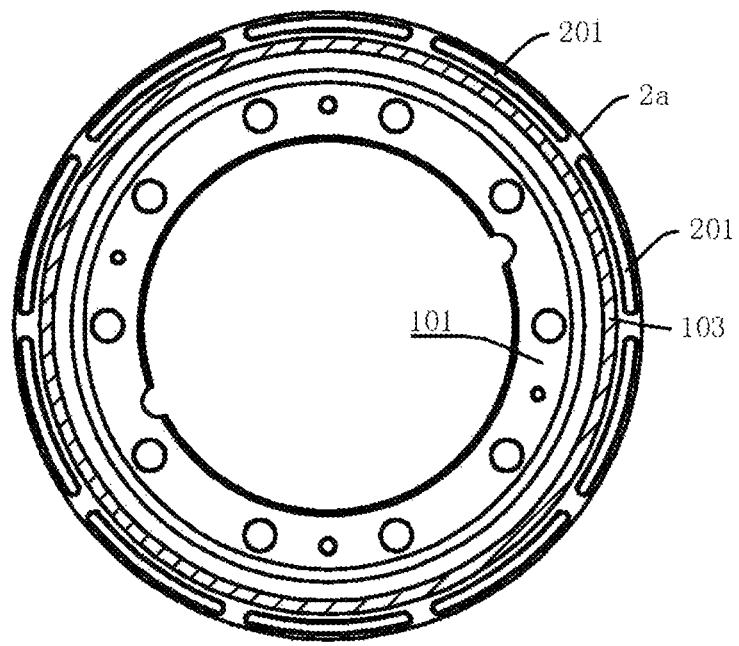
FIG. 6 is a sectional view of B-B in FIG. 5.
Figure 7:
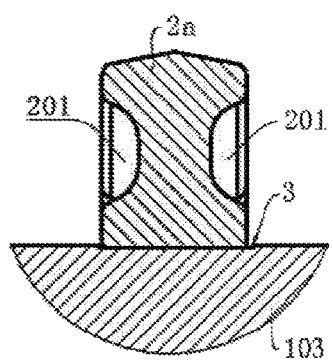
FIG. 7 is a partial enlarged view of A in FIG. 5.

As shown altogether in FIGS. 5 to 7, the structure of Example 5 is basically identical with that of Example 1 which comprises a brake drum body 1 and a group of hoop ferrule 2a, while the differences are: a plurality of (two or more than two) annular convex ribs 104 are disposed on part of the outer peripheral surface the brake portion 103 adjacent to the transitional connecting portion 102 of the brake drum body, and an annular groove 105 is formed between two adjacent annular convex ribs 104. The disposition of annular convex ribs 104 not only improves the strength of the brake drum body, but also increases heat dissipation areas, and the manufacturability is excellent and the cost is low.

The hoop ferrule 2a is tightly mounted to the brake portion 103, and located on part of the outer peripheral surface outside of the annular convex ribs 104. There are multiple (two or more than two) hoop ferrules, and generally, hoop ferrules 2a and the brake drum body 1 need to be heat-assembled to ensure that the hoop ferrules 2a will not detach from the brake drum body 1 in any conditions. Further, an annual groove 3 is disposed on the brake portion 103, and the hoop ferrules 2a are nested in the annual groove 3 so that the hoop ferrules 2a are mounted in a specified location.

As shown in FIGS. 6 and 7, the cross section of the hoop ferrules 2a is roughly rectangular. Each side of the two sides of the hoop ferrules 2a is disposed with a plurality of (two or more than two) heat dissipation groove 201 at intervals, which not only increases heat dissipation area, but also easily forms air convection while rotating which is beneficial for increasing heat dissipation efficiency. Based on the aforementioned purpose, heat dissipation grooves 201 can also be disposed on only one side of the hoop ferrules 2a at intervals.

Example 6

Figure 8:
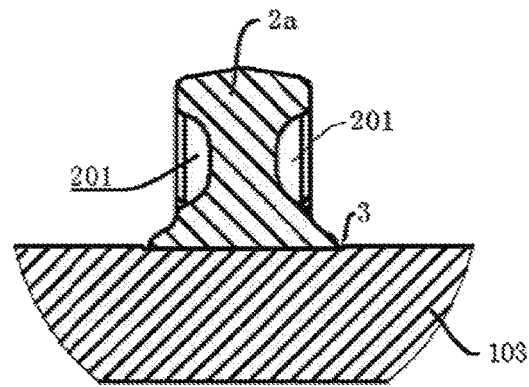
FIG. 8 is equivalent to the partial enlarged view of A in FIG. 5 according to Example 6 in the present invention.

As shown in FIG. 8, the structure thereof is basically identical with that of Example 5, and the differences are: the width of the bottom is greater than that of the top on the cross section of the hoop ferrules 2a so as to further increase the contact area between the hoop ferrules 2a and the brake drum body 1, enhance strength, and increase heat dissipation efficiency.

Example 7

Figure 9:
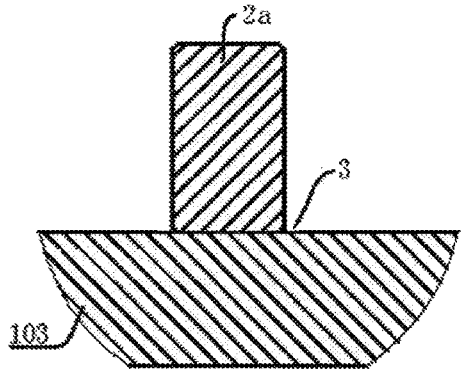
FIG. 9 is equivalent to the partial enlarged view of A in FIG. 5 according to Example 7 in the present invention.

As shown in FIG. 9, the structure thereof is basically identical with that of Example 5, and the differences are: the cross section shape of the hoop ferrule 2a is standard rectangular, and there is no heat dissipation groove 201 is disposed on the side. The purpose of making this simplified structure is to lower cost.

Figure 10:
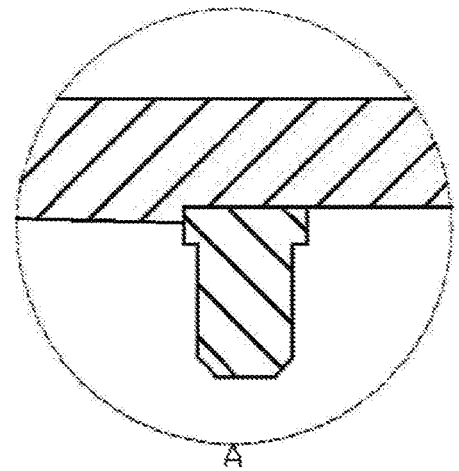
FIG. 10 is another possible structure of the hoop ferrule according to the present invention: the cross section thereof is roughly T-shaped.

As shown in FIG. 10, the structure thereof is basically identical with that of Example 5, and the difference is: the cross section shape of the hoop ferrule 2a is roughly T-shaped. The purpose of making this simplified structure is to lower cost. Compared with a rectangular cross section, a T-shaped hoop ferrule can have less weight while obtaining the same strength.

The hoop devices of the brake drums in Examples 1 to 7 all use a plurality of hoop ferrules. Because the hoop ferrules have a single row structure, it is more convenient for processing and manufacturing, and assembling flexibility is also improved. The shapes and numbers of the hoop ferrules shown in each figure are only illustrative but not limiting, and skilled artisans can increase or decrease the number of the hoop ferrules according to actual need, and the cross section shapes of the hoop ferrules can also be other shapes which can be realized by skilled artisans.

Example 8

Figure 11:
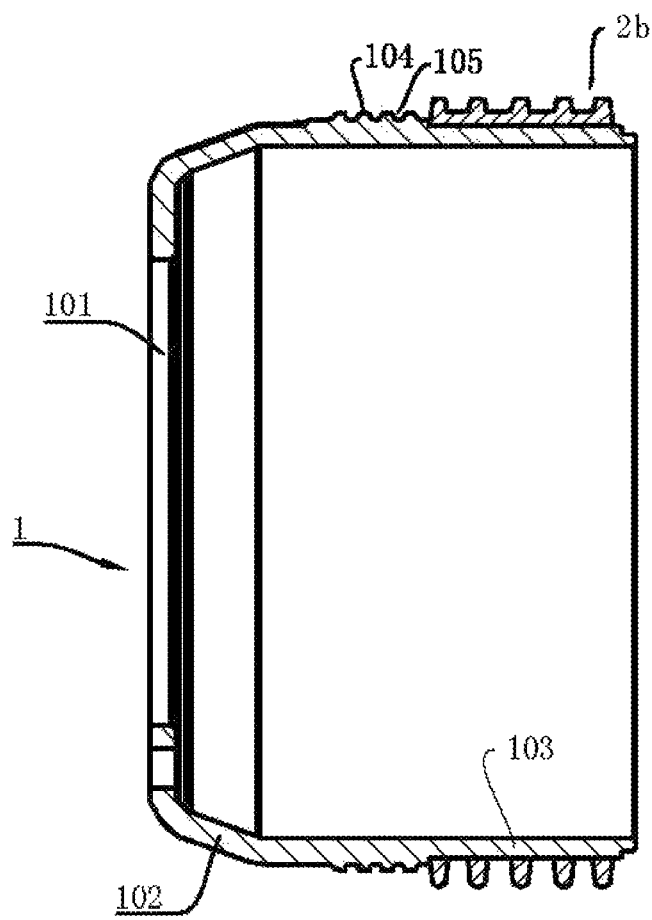
FIG. 11 is a vertical sectional view according to Example 8 in the present invention.
Figure 12:
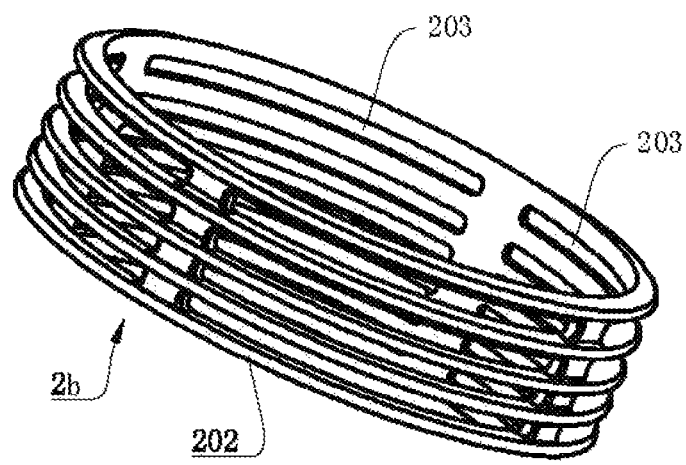
FIG. 12 schematically shows the three-dimensional structure of the hoop case in FIG. 11.

As shown in both FIGS. 11 and 12, the structure thereof is identical with that of Example 5, and the differences are: a plurality of hoop ferrules are connected at a bottom structure to form a hoop case which is tightly mounted to the brake portion 103 of the brake drum body 1. The connected hoop ferrules actually form a hollowed-out hoop case 2b. The solid part of the hoop case 2b is connected, and the hollow part is open to atmosphere. Although the hoop ferrules according to the present invention are preferably made of steel materials, the hoop case 26 can be made of cast iron, steel and aluminum materials. Cast iron materials are preferentially used to maximize the increase of heat dissipation property on the basis of ensuring strength. Both the hoop case 2b and hoop ferrule 2a are a kind of hoop device.

The hollow part of the hoop case 2b comprises a plurality of (one or more than one) heat dissipation hole groups, and each heat dissipation hole group comprises a plurality of (two or more than two) arc-shaped long holes 203 arranged along the circumferential direction at intervals. A plurality of (one or more than one) annular convex ribs 202 are disposed on the outer peripheral surface of the solid part of the hoop cases 2b to improve structural strength and mechanical property of the hoop cases 2b, and the annular convex ribs 202 are arranged adjacent to heat dissipation hole groups. The hollowed-out structures are not limited to these, and all structures that can both ensure strength and facilitate heat dissipation are feasible. The greatest advantage of the hollowed-out structure is that the hoop case 2b can be made into one whole entity, which can increase the assembling efficiency of the hoop case 2b and the brake drum body 1.

For the brake drums of Examples 5 to 8, a plurality of (two or more than two) annular convex ribs are disposed on part of the outer peripheral surface of the brake portion adjacent to the transitional connecting portion, and an annular groove is formed between two adjacent annular convex ribs. It is important to note that, the disposition of the annular convex rib and annular groove is not limited to Examples 5 to 8, skilled artisans may dispose annular convex ribs and annular grooves on part of the outer peripheral surface of the brake portion adjacent to the transitional connecting portion of the brake drums in Examples 1 to 4, according to actual need.

Example 9

Figure 13:
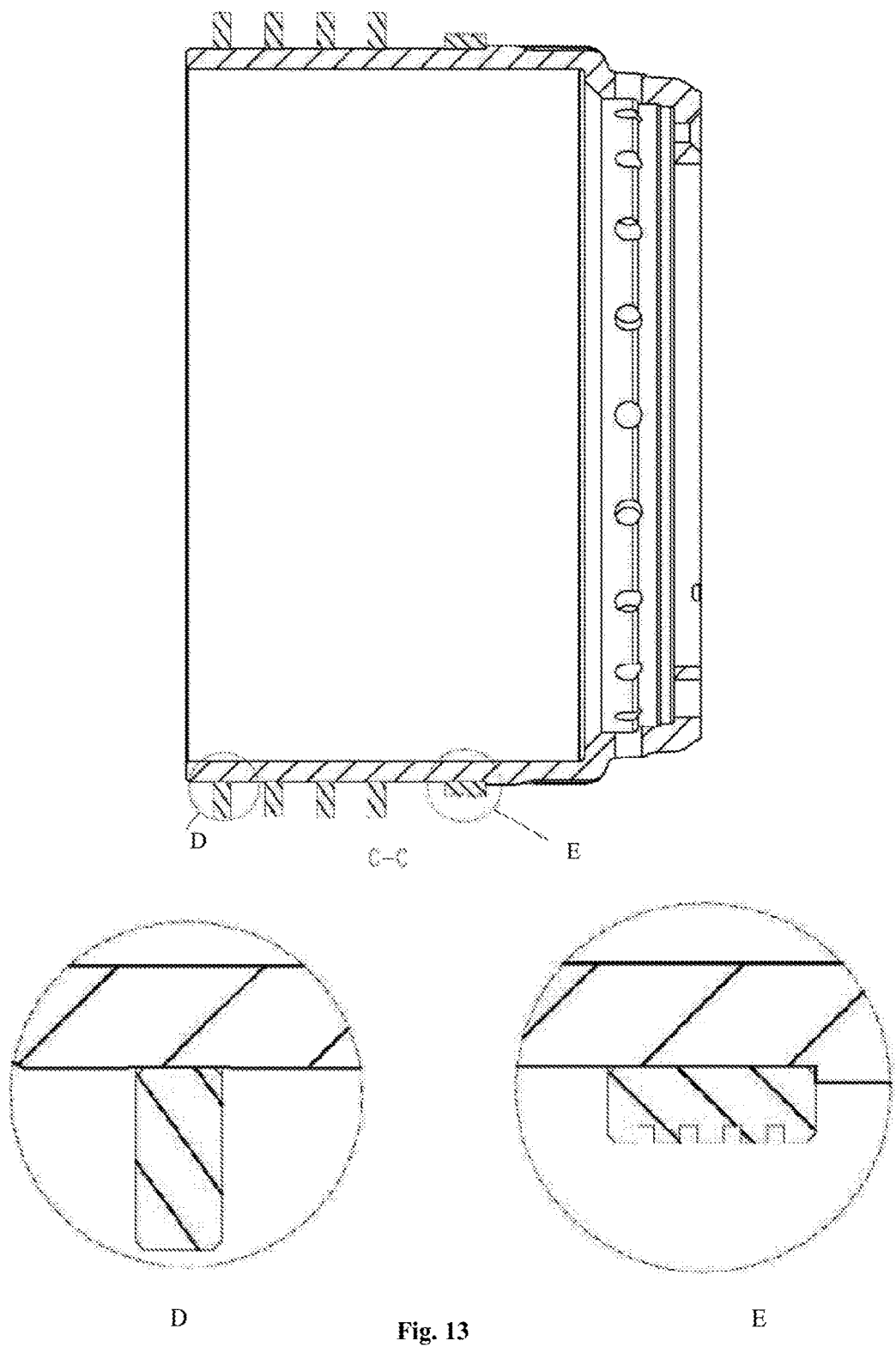
FIG. 13 is a vertical sectional view according to Example 9, showing that the brake drum body has no annular convex rib or annular groove on the transitional connecting portion, but has hoop ferrules with tooth-shaped cross section.

As shown in FIG. 13, the structure of the brake drum in Example 9 is that no annular convex rib or annular groove is disposed on the connecting portion of the brake drum body. Conversely, this position has one or more hoop ferrules with tooth-shaped cross section. Preferably, the radial height of the tooth-shaped hoop ferrule is lower than that of the hoop ferrules in other parts.

The above descriptions are only preferred examples of the present invention, which are not used to limit the present invention. Any amendments, equivalent replacements and improvements within the spirit and principle of the present invention should be all included in the protection scope of the present invention.

INDUSTRIAL APPLICABILITY

The hoop device tightly mounted on the outer peripheral surface of the braking portion of the brake drum according to the present invention can not only effectively restrain the radial expansion deformation, thereby improving fatigue resistance of the brake drum body, but also apply a clasp force to the brake drum body, thereby avoiding the danger of burst and flying out of the brake drum body, which greatly improves service life and use safety. Moreover, the wall thickness of the braking portion corresponding to the hoop device can be effectively reduced, which not only effectively decreases the temperature difference between the interior and exterior of the brake drum body, but also increases heat conductivity, thereby laying foundation for both heat dissipation and prevention of the happening of the multiple cracks in the inner wall of the brake drum body.

Annular convex ribs are disposed on part of the outer peripheral surface of the brake portion, which not only improves the strength of the brake drum body, but also increases heat dissipation area with a good manufacturability and low cost. Combining with the hoop device, it further achieves the goal of improving safety and extending service life with a more economic cost.

What is claimed:

1. A brake drum, comprising:
   a brake drum body made of cast iron having a cylindrical shape, which sequentially includes in its axial direction a mounting portion for connecting with a wheel, a braking portion for fitting with a brake shoe, an opening end of the brake drum; a transitional connecting portion disposed between the mounting portion and the braking portion; wherein a plurality of hoop ferrule mounting grooves are disposed on the outer peripheral surface of the braking portion; and
   a hoop device which is made of cast iron, steel or aluminum alloy, comprises two or more than two physically separate hoop ferrules having a radial height and a axial height, and is tightly mounted to the outer peripheral surface of the braking portion, wherein each hoop ferrule is restrainedly mounted in one hoop ferrule mounting groove, and wherein the radial height of the hoop ferrule is greater than the axial height so as to increase axial strength of the hoop ferrule, and meanwhile reduce contact area the brake drum body and increase heat dissipation.

2. The brake drum according to claim 1, wherein the hoop ferrules are made of steel material.

3. The brake drum according to claim 1, wherein the cross section area of the hoop ferrule in an axial middle position of the braking portion is greater than the cross section area of the hoop ferrule on two sides of the braking portion.

4. The brake drum according to claim 1, wherein the cross section shape of the hoop ferrules is rectangle, T-shaped, side H-shaped, square, semicircular or U-shaped.

5. The brake drum according to claim 1, wherein the cross section shape of the hoop ferrules is unequal-height U-shaped; the outer peripheral surface of the braking portion is disposed with a hoop ferrule mounting groove, and all the hoop ferrules sequentially abut against each other and are restrainedly mounted in the hoop ferrule mounting groove.

6. The brake drum according to claim 3, wherein the height of the hoop ferrules decreases incrementally from the axial middle position to the two sides of the braking portion.

7. The brake drum according to claim 1, wherein the hoop device comprises a plurality of first hoop ferrules arranged and disposed in the axial direction, and a second hoop ferrule disposed away from the transitional connecting portion and between two adjacent first hoop ferrules; and
   the width of the first hoop ferrules is greater than that of the second hoop ferrule, and the external diameter of the first hoop ferrules is less than that of the second hoop ferrule.

8. The brake drum according to claim 7, wherein the cross section shape of the first hoop ferrules is U-shaped or L-shaped or square; the cross section shape of the second hoop ferrules is square or semicircular or U-shaped.

9. The brake drum according to claim 1, wherein the cross section of the hoop ferrule is a rectangle or a rough rectangle, and two or more than two heat dissipation grooves are disposed on one side of the hoop ferrule at intervals, or two or more than two heat dissipation grooves are disposed on each side of the two sides of the hoop ferrule at intervals.

10. The brake drum according to claim 9, wherein the width of the bottom is greater than the width of the top on the cross section of the hoop ferrule.

11. The brake drum according to claim 1, wherein the hoop device comprises a plurality of hoop ferrules connected to each other at multiple sites on a bottom structure to form a hoop case which is tightly mounted onto the braking portion of the brake drum body.

12. The brake drum according to claim 11, wherein one or more than one heat dissipation hole groups are formed at the base of the hoop case, and each heat dissipation hole group comprises two or more than two arc-shaped long holes arranged along the circumferential direction at intervals.

13. The brake drum according to claim 1, wherein the brake drum body comprises one or more than one hoop ferrules having a tooth-shaped cross section adjacent to the connecting portion.

14. The brake drum according to claim 13, wherein the radial thickness of the tooth-shaped hoop ferrule is less than that of the other hoop ferrules.

15. The brake drum according to claim 1, wherein two or more than two annular convex ribs are disposed on the outer peripheral surface of the brake drum body adjacent to the transitional connecting portion, and an annular groove is formed between two adjacent annular convex ribs.

16. A method for manufacturing the brake drum according to claim 1, wherein the drum body is constructed through casting, and then the dynamic balance of the drum body is increased by post-processing; a hoop ferrule is independently manufactured and processed, and then tightly mounted to the drum body after heat expansion of the hoop ferrule.

17. The method for manufacturing the brake drum according to claim 16, wherein a hoop ferrule groove is formed in the braking portion of the drum body, and a convex rib and a groove structure are formed in the connecting portion of the drum body.

* * * * *